United States Patent
Fedde et al.

(10) Patent No.: US 9,360,005 B2
(45) Date of Patent: Jun. 7, 2016

(54) AUXILIARY DEVICE FOR AN AGRICULTURAL WORKING MACHINE

(71) Applicant: CLAAS SAULGAU GMBH, Bad Saulgau (DE)

(72) Inventors: Thomas Fedde, Delbrueck (DE); Matthias Zimmermann, Breuna (DE)

(73) Assignee: CLAAS SAULGAU GMBH, Bad Saulgau (DE)

( * ) Notice: Subject to any disclaimer, the term of this patent is extended or adjusted under 35 U.S.C. 154(b) by 338 days.

(21) Appl. No.: 14/160,772

(22) Filed: Jan. 22, 2014

(65) Prior Publication Data

US 2014/0202566 A1    Jul. 24, 2014

(30) Foreign Application Priority Data

Jan. 24, 2013   (DE) .......................... 10 2013 001 175

(51) Int. Cl.

| | |
|---|---|
| *F04B 49/00* | (2006.01) |
| *F16H 61/4096* | (2010.01) |
| *F16H 61/4165* | (2010.01) |
| *F16H 61/4139* | (2010.01) |
| *A01D 78/10* | (2006.01) |
| *F16H 61/4078* | (2010.01) |
| *A01D 69/03* | (2006.01) |
| *A01B 63/10* | (2006.01) |

(52) U.S. Cl.
CPC .............. *F04B 49/002* (2013.01); *A01D 69/03* (2013.01); *A01D 78/1057* (2013.01); *F16H 61/4078* (2013.01); *F16H 61/4096* (2013.01); *F16H 61/4139* (2013.01); *F16H 61/4165* (2013.01); *A01B 63/10* (2013.01); *Y10T 137/85978* (2015.04)

(58) Field of Classification Search
CPC ........... F16H 61/4078; F16H 61/4096; F16H 61/4039; F16H 61/4165; Y10T 137/85978; A01B 63/10; A01B 63/1006; A01B 63/102; F04B 49/002; F04B 49/03; F04B 49/035; F04B 49/106; F04B 49/08; A01D 69/03; A01D 78/1057
USPC ............................................................ 60/456
See application file for complete search history.

(56) References Cited

U.S. PATENT DOCUMENTS

| | | | |
|---|---|---|---|
| 5,332,053 | A | 7/1994 | Vachon |
| 5,685,136 | A | 11/1997 | Aron |
| 6,170,412 | B1 | 1/2001 | Memory et al. |
| 2011/0036651 | A1 | 2/2011 | Majkrzak |

FOREIGN PATENT DOCUMENTS

| | | |
|---|---|---|
| DE | 695 13 718 | 6/2000 |
| DE | 102 38 614 | 2/2004 |
| DE | 10 2009 047 732 | 6/2011 |

*Primary Examiner* — Nathaniel Wiehe
*Assistant Examiner* — Logan Kraft
(74) *Attorney, Agent, or Firm* — Michael J. Striker

(57) ABSTRACT

An auxiliary device for an agricultural working machine includes a hydraulic pump unit designed to pump a hydraulic fluid at a predetermined working pressure; a drive unit connected to the hydraulic pump unit that drives the hydraulic pump unit at the working pressure; a hydraulic drive having a drive-fluid inlet connected to a pump-fluid outlet of the hydraulic pump unit via a pressure line (P1, P2) and a drive-fluid outlet connected to a pump-fluid inlet via a supply line (S); and a fluid exchange device having a fluid supply line connected to the supply line (S) for a controlled supply of the hydraulic fluid from a hydraulic circuit of the working machine and a fluid discharge line connected to the supply line (S) upstream of the fluid supply line for the controlled discharge of the hydraulic fluid from the supply line (S) into the hydraulic circuit.

10 Claims, 1 Drawing Sheet

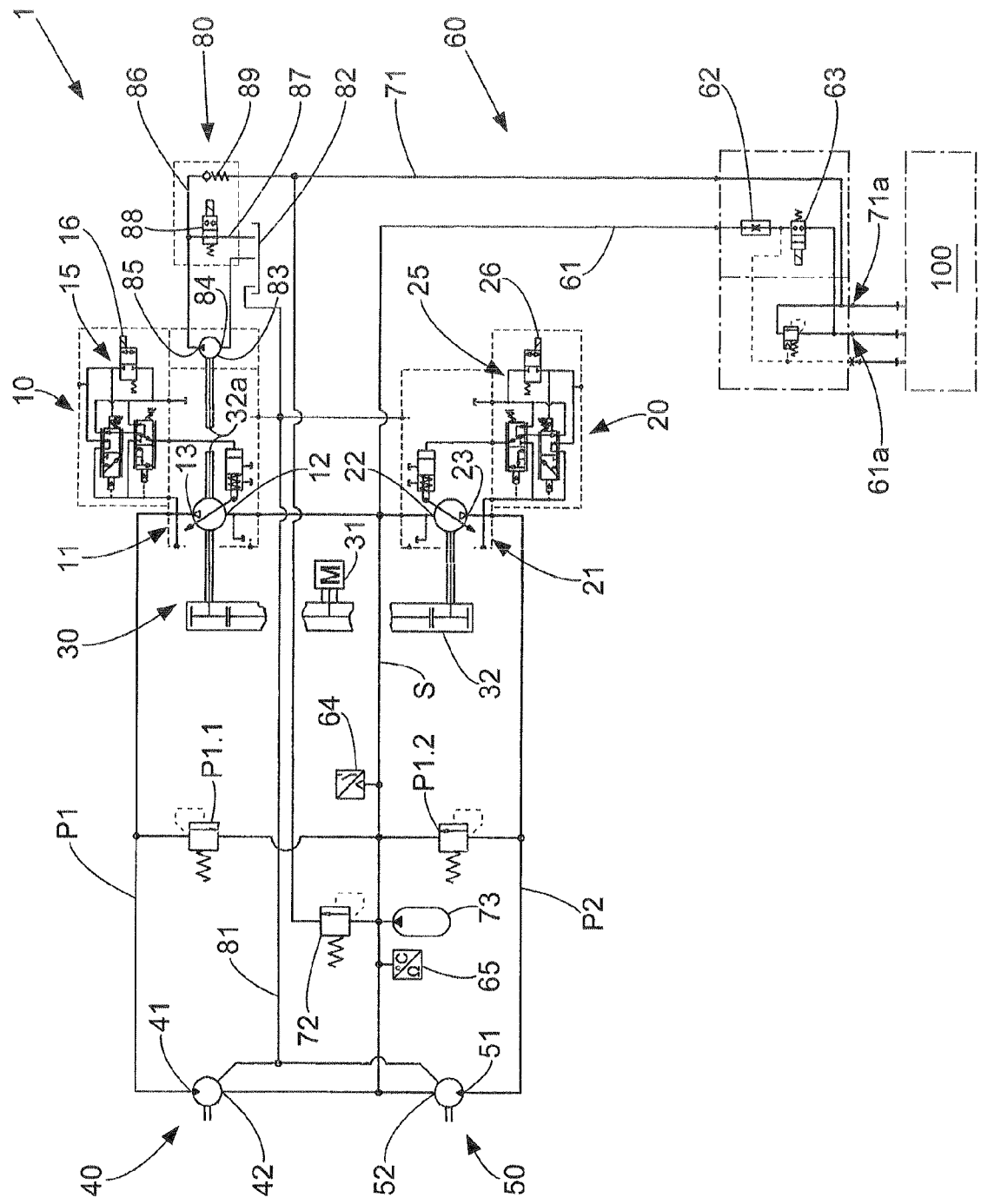

AUXILIARY DEVICE FOR AN AGRICULTURAL WORKING MACHINE

CROSS-REFERENCE TO A RELATED APPLICATION

The invention described and claimed hereinbelow is also described in German Priority Document DE 10 2013 001175.2, filed on Jan. 24, 2013. The German Priority Document, the subject matter of which is incorporated herein by reference, provides the basis for a claim of priority of invention under 35 U.S.C. 119(a)-(d).

BACKGROUND OF THE INVENTION

The invention relates to an auxiliary device for an agricultural working machine. Such an agricultural auxiliary device can be, for example, a combine-mounted device or a non-self-propelled, drawn agricultural machine such as a self-loading forage wagon or a swather. The self-propelled agricultural working machine is designed, in particular, as a tractor or a similar towing machine, without limitation.

Auxiliary devices for agricultural working machines are known. For example, document DE 695 13 718 T2 makes known a rotary swather as an auxiliary device for an agricultural working machine such as a tractor. The rotary swather comprises a hydraulic drive in the form of a hydraulic motor for driving a rotor. The rotary swather also comprises a dedicated hydraulic pump unit designed to pump a hydraulic fluid at a predetermined working pressure. In this case, the hydraulic motor is fluidically connected to the hydraulic pump unit disposed on the rotary swather via two hydraulic lines in order to supply the hydraulic motor with hydraulic fluid under working pressure and, to carry away the hydraulic fluid that is output by the hydraulic motor.

Such known auxiliary devices having a hydraulic drive are usually operated in the open hydraulic circuit. The resultant hydraulic heat loss is reflected in the warming of the hydraulic fluid (such as hydraulic oil, for example). In order to limit the temperature of the hydraulic fluid to a permissible temperature level, such hydraulic circuits have large tank volumes and surfaces or a cooler for the hydraulic fluid. Due to the large tank volumes and the hydraulic fluid contents thereof, the production costs are increased and high service costs result over the service life of the product. A cooler for the hydraulic fluid also requires a cooler drive, which is susceptible to contamination and also results in higher service requirements.

SUMMARY OF THE INVENTION

The present invention overcomes the shortcomings of known arts, such as those mentioned above.

To that end, the present invention provides an auxiliary device for an agricultural working machine, wherein the heat loss of the hydraulic circuit of the auxiliary device is carried away in a less complex yet reliable manner.

In an embodiment, the invention provides an auxiliary device for an agricultural working machine that comprises a hydraulic pump unit designed to pump a hydraulic fluid at a predetermined working pressure, a drive unit connected to the hydraulic pump unit in order to drive the hydraulic pump to provide the working pressure, a hydraulic drive having a drive-fluid inlet fluidically connected to a pump-fluid outlet of the hydraulic pump unit via a pressure line in order to supply the hydraulic drive with hydraulic fluid under working pressure and a drive-fluid outlet fluidically connected to a pump-fluid inlet of the hydraulic pump unit via a supply line in order to supply hydraulic fluid output by the hydraulic drive to the hydraulic pump unit and, a fluid exchange device having a fluid supply line fluidically connected to the supply line and which leads into a supply connection for the controlled supply of hydraulic fluid from a hydraulic circuit of the working machine and having a fluid drain line fluidically connected to the supply line upstream of the fluid supply line and leads into a discharge connection for the controlled discharge of hydraulic fluid from the supply line in the hydraulic circuit of the working machine.

The invention thereby discharges heat loss of the hydraulic circuit of the auxiliary device into the hydraulic circuit of the working machine in a manner that is less complex yet reliable.

According to the invention, the agricultural auxiliary device is designed, in particular, as a combine-mounted device or a non-self-propelled, drawn agricultural machine such as a self-loading forage harvester or a swather. Furthermore, the self-propelled agricultural working machine is designed as a tractor or a similar towing machine, without limitation.

According to the invention, the hydraulic circuit of the auxiliary device is designed as a closed hydraulic circuit. The hydraulic pump unit preferably operates with constant pressure and, at loads lower than the setting value thereof, pumps a constant volume flow of hydraulic fluid from the hydraulic drive. The hydraulic drive is designed as a hydraulic motor for providing rotary drive power. The drive unit for the hydraulic pump unit can be designed as an electric motor with or without a gearbox disposed on the output side, wherein, in the case of the electric motor, the power supply preferably takes place via the power supply system of the working machine.

As an alternative to an electric motor, the hydraulic pump unit also can be driven via a power take-off of the working machine. This power take-off is generally also referred to as a P.T.O. shaft or, according to the abbreviation of "power take-off", as PTO. The mechanical drive energy can be directed thereby to the hydraulic pump unit via a universal drive shaft arrangement in a generally known manner. Optionally, a gearbox also can be disposed between the power take-off and the hydraulic pump unit.

The hydraulic circuit of the working machine is preferably designed as a cooled hydraulic circuit and, therefore preferably has a dedicated cooler installed therein (hydraulic fluid cooler).

The invention makes use of the cooler of the working machine, such as a tractor, with the aid of a flushing solution.

Heat is flushed out by flushing the closed hydraulic circuit of the auxiliary device between the hydraulic pump unit and the hydraulic drive. In so doing, relatively cold hydraulic fluid is flushed from the working hydraulics of the working machine into the closed hydraulic circuit of the auxiliary device, and relatively warm hydraulic fluid is flushed out of the closed hydraulic circuit of the auxiliary device into the working hydraulics of the working machine. Heat exchange therefore takes place from the auxiliary device toward the working machine. The cooler installed in the working machine is utilized in order to dissipate the heat generated in the auxiliary device to the surroundings.

According to an embodiment, the fluid exchange device comprises a flow control valve incorporated into the fluid supply line in order to obtain a desired feed volume flow of hydraulic fluid from the hydraulic circuit of the working machine into the supply line. The fluid exchange device also comprises a back-pressure valve incorporated into the fluid drain line in order to compensate for a pressure increase induced in the supply line by the feed volume flow by releasing a discharge volume flow of hydraulic fluid from the supply line into the hydraulic circuit of the working machine.

By including a flow control valve located in the working hydraulics of the auxiliary device, a constant feed volume flow of relatively cool hydraulic fluid is flushed out of the working hydraulics of the working machine into the supply line of the working hydraulics of the auxiliary device. By use of the back-pressure valve (the pressure setting of which determines a supply pressure for the hydraulic pump unit), the same quantity of relatively hot hydraulic fluid is flushed into the working hydraulics of the working machine. The working hydraulics of the auxiliary device therefore gives off heat energy to the working hydraulics of the working machine in a defined and controlled manner. The working machine, in turn, cools the entire system of working machine/auxiliary device by the cooler installed in the working machine. The heat loss of the hydraulic circuit of the auxiliary device can therefore be dissipated more reliably, in a relatively simple manner.

In another embodiment, the fluid exchange device comprises a control valve incorporated into the fluid supply line in order to selectively allow or block the supply of hydraulic fluid from the hydraulic circuit of the working machine into the supply line. The control valve is preferably designed as a shut-off valve or a 2/2-directional control valve. The control valve is used to selectively connect and disconnect, in a leakage-free manner, the supply of hydraulic fluid from a hydraulic circuit of the working machine, such as the constant feed volume flow generated by the flow control valve.

In an embodiment, the fluid exchange device comprises a pressure sensor designed to detect a pressure of the hydraulic fluid in the supply line and output a corresponding pressure signal. The fluid exchange device has a signal connection to the control valve so when a predetermined limit pressure of the hydraulic fluid in the supply line is exceeded, the supply of hydraulic fluid from the hydraulic circuit of the working machine into the supply line is blocked. The limit pressure can be exceeded, for example, when the operator of the total system of working machine/auxiliary device forgets to connect the discharge connection to the hydraulic circuit of the working machine. In this case, after the pressure sensor detects that the pressure limit has been exceeded, the control valve (upon receipt of the pressure signal) automatically shuts off the feed volume flow, thereby increasing the operating safety of the auxiliary device.

According to another embodiment, the fluid exchange device comprises a pressure reservoir connected to the supply line in order to receive excess hydraulic fluid from the supply line. It is therefore possible to compensate for brief pressure spikes in the supply line. In addition, a reaction time of the shut-off procedure of the control valve is compensated for, thereby further increasing the operating safety of the auxiliary device.

According to another embodiment, the fluid exchange line comprises a temperature sensor designed to ascertain a temperature of the hydraulic fluid in the supply line and output a corresponding temperature signal. Elevated hydraulic fluid temperatures can therefore be automatically detected. The temperature signal can be used to activate a warning device for the operator and/or to influence the flow control valve, making it possible to reliably detect elevated hydraulic fluid temperatures and, preferably, to automatically down-regulate elevated hydraulic fluid temperatures by increasing the feed volume flow and, therefore, the discharge volume flow of hydraulic fluid. As a result, the reliability and operating safety of the auxiliary device are further increased.

In an embodiment, the auxiliary device comprises a leakage handling device designed to collect hydraulic fluid leakage occurring at the auxiliary device and provide this collected hydraulic fluid leakage for take-up into the hydraulic circuit of the working machine. The relatively warm hydraulic fluid leakage is discharged thereby into the hydraulic circuit of the working machine to be cooled, promoting and simplifying the cooling of the hydraulic circuit of the auxiliary device.

In an embodiment, the leakage handling device comprises a collecting tank for collecting the hydraulic fluid leakage, and a leakage pump. The leakage pump has a leakage pump-fluid inlet fluidically connected to the collecting tank in order to convey hydraulic fluid leakage out of the collecting tank and, a leakage pump-fluid outlet fluidically connected to the discharge connection of the fluid exchange device via a leakage discharge line, making it possible to selectively feed the hydraulic fluid leakage from the collecting tank to the discharge connection.

In an embodiment, the leakage handling device comprises a bypass line, which leads into the collecting tank, is connected to the leakage discharge line and in which a control valve is incorporated. The control valve is designed to selectively allow or block a return flow of the hydraulic fluid leakage from the leakage discharge line into the collecting tank. The control valve comprises a non-return valve incorporated in the leakage discharge line downstream of the connection of the bypass line in order to block a return flow of hydraulic fluid from the discharge connection in the direction toward the leakage handling device.

Any hydraulic fluid leakage that occurs is captured via leakage lines and is drained into the collecting tank. The collecting tank is preferably equipped with a float switch, which switches the control valve (e.g. a 2/2-directional control valve or a shut-off valve). When the collecting tank is full, the unpressurized circulation of the leakage pump (which is preferably designed as a gear pump) is closed, and the leakage pump pumps the contents of the collecting tank via the non-return valve to the discharge connection and from there, preferably into a tank line of the hydraulic system of the working machine. If the collecting tank has been emptied, the leakage pump is switched back into unpressurized circulation by the float switch and the control valve. The non-return valve prevents hydraulic fluid from flowing from the tank, line into the collecting tank. The hydraulic fluid leakage can be selectively and forcibly redirected thereby into the hydraulic circuit of the working machine reliably preventing a backflow of the hydraulic fluid.

Alternatively, it is possible to return the hydraulic fluid leakage that occurs back to the working machine directly via an unpressurized leakage line. For the case in which this leakage line is not connected to the working machine, a pressure switch is required as a pressure safeguard. This pressure switch detects an overpressure in the leakage line, and an accumulator is required for the intermediate storage of a small quantity of hydraulic fluid leakage until the operator has received a warning message.

In an embodiment, the hydraulic pump unit comprises a hydraulic pump control unit for controlling the working pressure. The pump control unit comprises a control valve designed to selectively reduce a control pressure of the pump control unit and, therefore, the hydraulic pump unit pumps the hydraulic fluid at a predetermined minimum pressure that is lower than the working pressure and does not induce operation of the hydraulic drive.

With the aid of the control valve (which can be designed as a shut-off valve or a 2/2-directional control valve, for example), it is possible to relieve a spring chamber of the pump control unit toward a tank, whereby the hydraulic pump unit merely generates a stand-by pressure that is preferably lower than the minimum pressure required to operate (e.g. to provide rotary drive power) the hydraulic drive. This stand-by switch can be used, therefore, to individually shut off rotors of a rotary swather.

According to the invention, all sensors and valves are preferably connected to an electronic control unit (ECU). The ECU implements a signal exchange, a signal evaluation and an actuation (for the purpose of control or regulation) of the components of the auxiliary device. The valves are preferably designed as electromagnetic valves or solenoid-controlled valves.

BRIEF DESCRIPTION OF THE DRAWINGS

Further features and advantages of the invention will become apparent from the description of embodiments that follows, with reference to the attached FIGS., wherein:

FIG. 1 presents a circuit diagram of a hydraulic circuit of an agricultural auxiliary device for an agricultural working machine according to an embodiment of the invention.

DETAILED DESCRIPTION OF THE INVENTION

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

The non-self-propelled agricultural auxiliary device 1 shown in FIG. 1 is designed as a rotary swather and, is intended to be attached to an agricultural working machine 100, such as a tractor functioning as a towing machine.

As is evident from FIG. 1, the auxiliary device 1 comprises a hydraulic pump unit 10-20, a drive unit 30 for the hydraulic pump unit 10-20, two hydraulic drives 40 and 50 designed as orbital motors for providing rotary drive power for rotors (not shown) of the auxiliary device 1, a fluid exchange device 60 and a leakage handling device 80.

The auxiliary device 1 further comprises a plurality of valves and sensors provided for controlling and regulating the hydraulic circuit of the auxiliary device 1. The sensors and valves are connected via (non-illustrated) signal lines to an electronic control unit (ECU). The ECU implements signal exchange and signal evaluation and actuation (for the purpose of control or regulation) of the components of the auxiliary device 1. The valves are designed as electromagnetic valves or solenoid-controlled valves.

The hydraulic pump unit 10-20 is designed to pump hydraulic fluid (such as hydraulic oil) at a predetermined working pressure. The hydraulic pump unit 10-20 comprises separate hydraulic pumps 11, 21, respectively, which are designed as constant pressure pumps, for each of the two hydraulic drives 40, 50. At loads lower than the setting value thereof, these hydraulic pumps 11, 21 pump a constant volume flow of hydraulic fluid to the respectively associated hydraulic drive 40, 50. The drive unit 30 comprises an electric motor 31 and a gearbox 32 provided on the output side of the electric motor. The gearbox connects the electric motor 31 to both hydraulic pumps 11, 21 of hydraulic pump unit 10-20 in order to drive each of these in order to provide the working pressure.

Each of the two hydraulic drives 40, 50 has a drive-fluid inlet 41 or 51, respectively, which is fluidically connected via a pressure line P1 or P2, to a pump-fluid outlet 13 or 23, respectively, of the associated hydraulic pump 11 or 21 of the hydraulic pump unit 10-20. The pump-fluid outlets 13, 23 supply the respective hydraulic drive 40, 50 with hydraulic fluid under working pressure.

Each of the two hydraulic drives 40, 50 also has a drive-fluid outlet 42 or 52, respectively, which is fluidically connected via a supply line S to a pump-fluid inlet 12 or 22, respectively, of the associated hydraulic pump 11 or 21 of the hydraulic pump unit 10-20. The pump-fluid outlets 13 or 23 feed hydraulic fluid output by the two hydraulic drives 40, 50 to the hydraulic pumps 11, 21 of the hydraulic pump unit 10-20.

In the event of an overload, a respective pump control unit 15 or 25 (designed to perform regulation in particular) having an adjusting unit of the hydraulic pumps 11, 21, limits the working pressure to the value that was set. In the case of an externally applied overload, respective pressure-limiting valves P1.1 and P1.2 relieve the respective pressure lines P1, P2 toward the supply line S.

A fluid exchange device 60 comprises a fluid supply line 61, a flow control valve 62, a control valve 63 in the form of a 2/2-directional control valve, a pressure sensor 64, a temperature sensor 65, a fluid discharge line 71, a back-pressure valve 72 and a pressure reservoir 73.

The fluid supply line 61 is fluidically connected to the supply line S and leads into a supply connection 61a for the controlled supply of hydraulic fluid from a hydraulic circuit (preferably from a pressure line thereof, which carries cooled hydraulic fluid) of the working machine 100. The fluid discharge line 71 is fluidically connected to the supply line S upstream of the fluid supply line 61 and leads into a discharge connection 71a for the controlled discharge of hydraulic fluid from the supply line S into the hydraulic circuit (preferably into a tank line thereof) of the working machine 100.

The hydraulic circuit of the working machine 100 is preferably designed as a cooled hydraulic circuit and therefore, has a dedicated cooler installed therein (one or more hydraulic fluid coolers).

The flow control valve 62 is incorporated into the fluid supply line 61 to achieve a desired feed volume flow of hydraulic fluid from the hydraulic circuit of the working machine 100 into the supply line S. The back-pressure valve 72 is incorporated into the fluid discharge line 71 in order to compensate for a pressure increase, which is induced in the supply line S by the feed volume flow, by redirecting a discharge volume flow of hydraulic fluid from the supply line S into the hydraulic circuit of the working machine 100.

A constant feed volume flow of relatively cool hydraulic fluid is flushed from the hydraulic circuit of the working machine 100 into the supply line S of the hydraulic circuit of the auxiliary device 1 via the flow control valve 62. Using the back-pressure valve 72, the pressure setting of which determines a supply pressure for the hydraulic pump unit 10-20, the same quantity of relatively hot hydraulic fluid is flushed into the working hydraulics of the working machine 100. The hydraulic circuit of the auxiliary device 1 therefore gives off heat energy to the hydraulic circuit of the working machine 100 in a defined and controlled manner. The working machine, in turn, cools the entire system of working machine/auxiliary device by the cooler installed in the working machine. The heat loss of the hydraulic circuit of the auxiliary device 1 can therefore be carried away more reliably in a relatively simple manner.

The control valve 63 of the fluid exchange device 60 is incorporated into the fluid supply line 61 upstream of the flow control valve 62, in order to selectively allow or block the supply of hydraulic fluid from the hydraulic circuit of the working machine 100 into the supply line S. The control valve 63 can be used to selectively connect and disconnect, in a leakage-free manner, the supply of hydraulic fluid from a hydraulic circuit of the working machine 100.

The pressure sensor 64 is designed to detect a pressure of the hydraulic fluid in the supply line S and output a corresponding pressure signal to the control device. To do so, the pressure sensor has a signal connection to the control valve 63 incorporated into the fluid supply line 61. Hence, when a predetermined limit pressure of the hydraulic fluid in the supply line S is exceeded, the control valve receives the pressure signal indicative of same and blocks the supply of hydraulic fluid from the hydraulic circuit of the working machine 100 into the supply line S.

The limit pressure can be exceeded, for example, if the operator of the entire system of working machine/auxiliary device forgets to connect the discharge connection 71a to the hydraulic circuit of the working machine 100. In this case, the control valve 63 automatically shuts off the feed volume flow after the pressure sensor 64 detects that the pressure limit has been exceeded.

The pressure reservoir 73 is connected to the supply line S in order to receive excess hydraulic fluid from the supply line S. It is therefore possible to compensate for brief pressure spikes in the supply line S, for example, during a reaction time of the shut-off procedure of the control valve 63.

The temperature sensor 65 is designed to ascertain a temperature of the hydraulic fluid in the supply line S and output a corresponding temperature signal to the control device. The temperature signal can be used to activate a non-illustrated warning device for the operator and/or, to influence the flow control valve 62 and render it possible to reliably detect and automatically down-regulate elevated hydraulic fluid temperatures by increasing the feed volume flow and, therefore, the discharge volume flow of hydraulic fluid.

The leakage handling device 80 is designed to collect hydraulic fluid leakage occurring at the auxiliary device 1 and to provide this collected hydraulic fluid leakage for take-up into the hydraulic circuit of the working machine 100.

The leakage handling device comprises a leakage line 81 for receiving hydraulic fluid leakage at the hydraulic drives 40, 50 and the hydraulic pump unit 10-20. The leakage handling device comprises a collecting tank 82 for collecting the hydraulic fluid leakage from the leakage line 81, a leakage pump 83 having a leakage pump-fluid inlet 84 and a leakage pump-fluid outlet 85, a leakage discharge line 86, a bypass line 87, a control valve 88 designed as a 2/2-directional control valve and a non-return valve 89.

The leakage pump 83 is driven in a rotating manner via a connecting shaft 32a of the gearbox 32 of the drive unit 30. The leakage pump-fluid inlet 84 of the leakage pump 83 is fluidically connected to the collecting tank 82 in order to convey hydraulic fluid leakage out of the collecting tank 82. The leakage pump-fluid outlet 85 of the leakage pump 83 is fluidically connected to the discharge connection 71a of the fluid exchange device 60 via the leakage discharge line 86 and the fluid discharge line 71, thereby making it possible to selectively supply the hydraulic fluid leakage from the collecting tank 82 to the discharge connection 71a and, from there, to the hydraulic system of the working machine 100.

For this selective control of the hydraulic fluid leakage, the bypass line 87, connected to the leakage discharge line 86, leads into the collecting tank 82. The control valve 88 is incorporated into the bypass line 87 and is designed to selectively allow or block a return flow of the hydraulic fluid leakage from the leakage discharge line 86 into the collecting tank 82.

The non-return valve 89 is incorporated into the leakage discharge line 86 downstream of the connection of the bypass line 87 in order to block a return flow of hydraulic fluid from the discharge connection 71a in the direction toward the leakage handling device 80.

Any hydraulic fluid leakage that occurs can be captured by the leakage handling device 80 via the leakage line 81 and redirected into the collecting tank 82 equipped with the float switch. The float switch is connected to the control device, which, in turn, switches the control valve 88 of the leakage handling device 80. If the collecting tank 82 is full, the unpressurized circulation of the leakage pump 83 (which is preferably designed as a gear pump), is closed by the control valve 88 blocking the bypass line 87, and the leakage pump 83 pumps the contents of the collecting tank via the non-return valve 89 to the discharge connection 71a. From there, the contents flow into the tank line of the hydraulic system of the working machine 100. If the collecting tank 82 has been emptied, the leakage pump 83 is switched back into unpressurized circulation via the float switch, the control device, and the control valve 88 of the leakage handling device 80 by releasing the bypass line 87. The non-return valve 89 prevents hydraulic fluid from flowing from the tank line of the hydraulic system of the working machine 100 into the collecting tank 82.

Finally, the respective pump control units 15 and 25 of the hydraulic pumps 11, 21, respectively, each comprise a control valve 16 and 26, respectively. These control valves are designed as 2/2-directional control valves in this case, to selectively reduce a control pressure of the associated pump control unit 15 or 25, respectively. Therefore, the associated hydraulic pump 11, 21 of the hydraulic pump unit 10-20 pumps the hydraulic fluid at a predetermined minimum pressure that is lower than the working pressure and does not induce operation of the hydraulic drive 40, 50, which is connected to the applicable hydraulic pump 11, 21 on the pressure side.

With the aid of the control valve 16, 26, a spring chamber of the pump control unit 15, 25 is preferably relieved toward a tank in this case, whereby the associated hydraulic pump 11, 21 of the hydraulic pump unit 10-20 merely generates a stand-by pressure. The standby pressure is preferably lower than the minimum pressure required for the operation (i.e. providing rotary drive power) of the respective hydraulic drive 40, 50, which is connected on the pressure side. Same relatively lower standby pressure makes it possible to use this stand-by circuit in order to individually shut off the rotors of the auxiliary device 1, which is designed as a rotary swather in this case.

LIST OF REFERENCE CHARACTERS 1 auxiliary device
10-20 hydraulic pump unit
11 hydraulic pump
12 pump-fluid inlet
13 pump-fluid outlet
15 pump control unit
16 control valve
21 hydraulic pump 22 pump-fluid inlet
23 pump-fluid outlet
25 pump control unit
26 control valve
30 drive unit
31 electric motor
32 gearbox
32a connecting shaft
40, 50 hydraulic drive
41, 51 drive-fluid inlet
42, 52 drive-fluid outlet
60 fluid exchange device
61 fluid supply line
61a supply connection
62 flow control valve
63 control valve
64 pressure sensor
65 temperature sensor
71 fluid discharge line
71a discharge connection
72 back-pressure valve
73 pressure reservoir
80 leakage handling device
81 leakage line
82 collecting tank
83 leakage pump
84 leakage pump-fluid inlet
85 leakage pump-fluid outlet
86 leakage discharge line
87 bypass line
88 control valve
89 non-return valve
100 working machine
P1, P2 pressure line
P1.1, P1.2 pressure-limiting valve
S supply line As will be evident to persons skilled in the art, the foregoing detailed description and FIGS. are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. An auxiliary device for an agricultural working machine, comprising:
   a hydraulic pump unit designed to pump a hydraulic fluid at a predetermined working pressure;
   a drive unit connected to the hydraulic pump unit that drives the hydraulic pump unit to provide the working pressure;
   a hydraulic drive having a drive-fluid inlet fluidically connected to a pump-fluid outlet of the hydraulic pump unit via a pressure line (P1, P2) in order to feed the hydraulic fluid under the working pressure to the hydraulic drive and, having a drive-fluid outlet fluidically connected to a pump-fluid inlet via a supply line (S) feed the hydraulic fluid output by the hydraulic drive to the hydraulic pump unit, and
   a fluid exchange device having a fluid supply line fluidically connected to the supply line (S) and arranged to lead into a supply connection for a controlled supply of the hydraulic fluid from a hydraulic circuit of the working machine and, having a fluid discharge line fluidically connected to the supply line (S) upstream of the fluid supply line and arranged to lead into a discharge connection for the controlled discharge of the hydraulic fluid from the supply line (S) into the hydraulic circuit of the working machine.

2. The auxiliary device according to claim 1, wherein the fluid exchange device comprises a flow control valve incorporated into the fluid supply line to obtain a desired feed volume flow of the hydraulic fluid from the hydraulic circuit of the working machine into the supply line (S) and, a back-pressure valve incorporated into the fluid drain line to compensate for a pressure increase induced in the supply line (S) by the feed volume flow by releasing a discharge volume flow of the hydraulic fluid from the supply line into the hydraulic circuit of the working machine.

3. The auxiliary device according to claim 1, wherein the fluid exchange device comprises a control valve incorporated into the fluid supply line to selectively allow or block the supply of the hydraulic fluid from the hydraulic circuit of the working machine into the supply line (S).

4. The auxiliary device according to claim 3, wherein the fluid exchange device comprises a pressure sensor designed to detect a pressure of the hydraulic fluid in the supply line (S) and output a corresponding pressure signal and, a signal connection to the control valve, wherein upon detection that a predetermined limit pressure of the hydraulic fluid in the supply line (S) is exceeded, the pressure sensor generates a pressure signal that causes the supply of hydraulic fluid from the hydraulic circuit of the working machine into the supply line (S) to be blocked.

5. The auxiliary device according to claim 1, wherein the fluid exchange device comprises a pressure accumulator connected to the supply line (S) to receive excess hydraulic fluid from the supply line (S).

6. The auxiliary device according to claim 1, wherein the fluid exchange device comprises a temperature sensor designed to ascertain a temperature of the hydraulic fluid in the supply line (S) and output a corresponding temperature signal.

7. The auxiliary device according to claim 1, comprising a leakage handling device designed to collect hydraulic fluid leakage occurring at the auxiliary device and provide the collected hydraulic fluid leakage for take-up into the hydraulic circuit of the working machine.

8. The auxiliary device according to claim 7, wherein the leakage handling device comprises a collecting tank for collecting the hydraulic fluid leakage and a leakage pump having a leakage pump-fluid inlet fluidically connected to the collecting tank to convey hydraulic fluid leakage out of the collecting tank and, a leakage pump-fluid outlet fluidically connected to the discharge connection of the fluid exchange device via a leakage discharge line enabling selectively feeding the hydraulic fluid leakage from the collecting tank to the discharge connection.

9. The auxiliary device according to claim 8, wherein the leakage handling device comprises:
   a bypass line that leads into the collecting tank, is connected to the leakage discharge line and includes a control valve incorporated therein, wherein the control valve selectively allows or blocks a return flow of the hydraulic fluid leakage from the leakage discharge line into the collecting tank, and
   a non-return valve incorporated in the leakage discharge line downstream of the connection of the bypass line in order to block a return flow of hydraulic fluid from the discharge connection in the direction toward the leakage handling device.

10. The auxiliary device according to claim 1, wherein the hydraulic pump unit comprises a hydraulic pump control unit for controlling the working pressure, the pump control unit comprising a control valve designed to selectively reduce a control pressure of the pump control unit in order to enable the hydraulic pump unit to pump the hydraulic fluid at a predetermined minimum pressure that is lower than the working pressure and that does not induce operation of the hydraulic drive.

* * * * *